Aug. 4, 1959

H. R. PHILIPP 2,898,498

PHOTOEMITTERS

Filed July 19, 1956

Inventor:
Herbert R. Philipp,
by Paul A. Frank
His Attorney.

United States Patent Office 2,898,498
Patented Aug. 4, 1959

2,898,498

PHOTOEMITTERS

Herbert Reynold Philipp, Schenectady, N.Y., assignor to General Electric Company, a corporation of New York Application July 19, 1956, Serial No. 598,839

11 Claims. (Cl. 313—101)

The present invention relates to photoemitters, and more particularly to photoemitters which are selectively sensitive to vacuum ultra-violet radiation.

Many present photoemitters, for example cathodes of photoelectric tubes, are sensitive to ultra-violet light. For many of the uses to which photoelectric tubes are utilized, however, a wide range of sensitivity is a disadvantage. In other words, in many instances it is desirable and necessary that the photosensitivity of a particular photoemissive cathode be limited to the particular wavelength range which is sought to be detected. One example of such selectivity is found in mercury vapor detectors. In mercury vapor detectors it is desirable that the photosensitive device utilized be insensitive to visible light, but yet be very sensitive to ultra-violet light. While there are many photosensitive detectors available for visible and near ultra-violet light, there is a great need for new and efficient photosensitive materials for the provision of vacuum ultra-violet detectors. For the purposes of this specification vacuum ultra-violet radiation will be defined as ultra-violet radiation having wavelength shorter than 2000 A.U.

Accordingly, it is an object of this invention to provide a photoemitter which is sensitive to light in the vacuum ultra-violet while being negligibly sensitive to visible light and near ultra-violet.

It is another object of the invention to provide a high efficiency, vacuum ultra-violet sensitive, photoemissive cathode.

Briefly stated, in accord with my invention I provide a photoemissive cathode comprising a high-purity stoichiometric alkali halide compound. Photoelectric tubes having photoelectric cathodes of these materials exhibit high quantum yields in the vacuum ultra-violet region.

The novel features believed characteristic of the invention are set forth in the appended claims. The invention itself, together with further objects and advantages thereof, may best be understood with reference to the following description taken in connection with the attached drawing in which, Figure 1 represents a photoelectric tube constructed in accord with the invention, and Figure 2 is a semi-logarithmic graph of the ultra-violet photoemission of a certain of the photoemitters of the invention.

Figure 1:
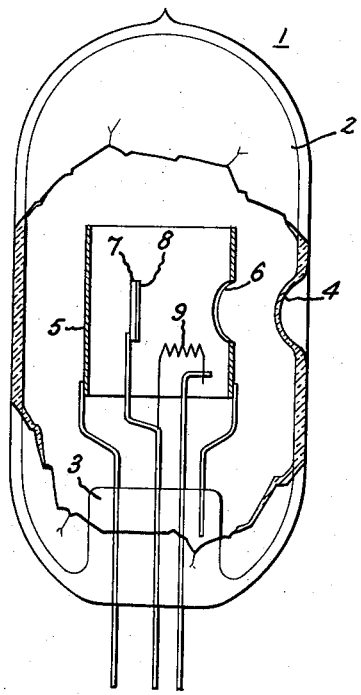
Figure 2:
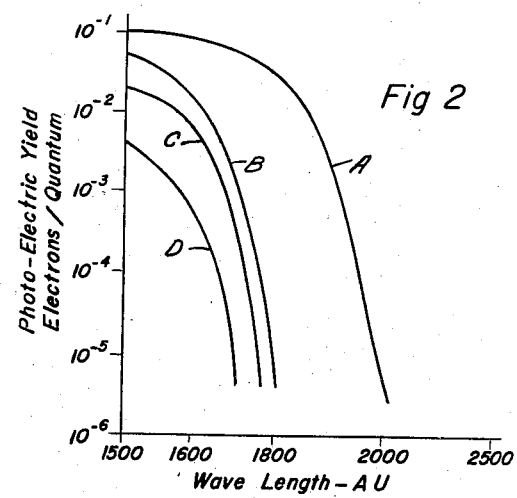

In Figure 1, a photoelectric tube 1 constructed in accord with the invention comprises an evacuable vitreous envelope 2, which may conveniently be of glass, having a reentrant portion 3 into which suitable leads and electrodes are fastened, and an ultra-violet transparent window 4. Window 4 may, for example, be of quartz, lithium fluoride or a thin bubble of Corning No. 9741 ultra-violet transparent glass. Within envelope 2 are located a collector electrode 5 which, in the illustrated embodiment, comprises a cylindrical electrode of platinum or other suitable electrode material with a circular orifice 6 therein. A photocathode base 7 comprising a suitable conductive metal such as platinum or nickel, non-reactive with halogen gases at room temperature is located within the confines of collector electrode 5 and has thereon a thin layer 8 of an ultra-violet sensitive photoemissive substance comprising a highly purified stoichiometric alkali halide compound. An evaporation helix 9 or other suitable evaporation filament for depositing photoemissive layer 8 upon photocathode base 7 is also located within the confines of the cylinder of collector electrode 5 and closely juxtaposed to photocathode 7, but is so positioned as to be removed from the optical path from photocathode base 7 through orifice 6 in collector cylinder 5 and through ultra-violet transparent window 4 in envelope 2. Helix 9 may conveniently be of platinum, nickel or a refractory metal such as molybdenum or tungsten. Collector electrode 5, photocathode base 7, and evaporation helix 9 are all supported by suitable support members embedded in reentrant portion 3 of envelope wall 2, and are connected therethrough to suitable lead wires.

In the preparation of ultra-violet photo tubes in accord with the invention a mass of a stoichiometric alkali halide compound preferably having an impurity concentration of less than 100 parts per million is placed upon helix 9 and assembled within envelope 2 in the configuration illustrated. Alternatively, a powdered mass may be placed in a refractory boat which replaces helix 9, or a single crystal may be clamped thereto. The envelope is connected to a suitable vacuum pump and the atmosphere within envelope 2 is evacuated to a pressure of 1 micron of mercury or less. The envelope is then sealed off and an electric current is momentarily caused to flow through evaporation helix 9, causing it to heat to incandescence and to volatilize the alkali halide thereupon. Alternatively, the alkali halide may be volatilized while the tube is connected to the vacuum system and excess gas and vapors simultaneously removed. The alkali halide is thus deposited in a clear crystalline film 8 upon photocathode base 7. This method for the deposition of the photosensitive member of the illustrated photo tube is preferred because the selective photoelectric emission of the photoemitters of the invention is dependent, in part, upon the high purity of the material utilized. When the photoemitter is deposited in accord with the above-described method the possibilities of impurities entering into the material utilized are minimized. Stoichiometric alkali halide compounds of sufficient purity are commercially available in reagent grade from many chemical suppliers.

I have discovered that stoichiometric alkali halide compounds exhibit a high photoelectric yield when irradiated by ultra-violet light having a wavelength shorter than 2000 A.U. I have also discovered that this photoelectric emission of these materials is dependent upon the excitation of the alkali halide itself, and is believed due to emission from the valance band of the crystal lattice. This photoelectric emission is to be contrasted with the emission of other photoelectric materials which is due to the ionization of impurities deliberately introduced or accidentally present therein, or to $f$-center or exciton excitation. As is well known to the art an $f$-center is a vacancy in the crystal lattice caused by a missing anion and occupied by an electron. F-centers may be created by electron irradiation. Excitons also well known to the art are excited electron-hole pairs. In accord with the preferred embodiment of the present invention, the photoemitters of the invention are provided in highly purified form having less than 100 parts per million of impurities therein, so that the material exhibits no impurity photosensitivity and thus exhibits no photosensitivity in the visible or near ultra-violet regions. These materials do, however, exhibit a high photoelectric yield in the vacuum ultra-violet regions, specifically in the short wavelength region below 2000 A.U. In this region, the materials of the invention exhibit a photoelectric yield up to the order of $10^{-1}$ electrons per quantum of incident radiation, a yield equal to or better than any ultra-violet photoemissive material presently available.

Thus, in their highly purified form the photoemitters of the invention exhibit a selective photosensivity, being substantially insensitive to visible and near ultra-violet radiation but exhibiting a high photosensitivity to vacuum ultra-violet radiation.

More specifically, each of the alkali halide photoemitters of the invention displays a high sensitivity to vacuum ultra-violet radiation. The threshold for each alkali halide, however, depends upon the particular material utilized. For example, the iodides of sodium, potassium, rubidium and lithium have a threshold of sensitivity at wavelengths of approximately 1700 A.U. The bromides of sodium, potassium, rubidium and lithium are highly sensitive to short wavelength radiation below 1550 A.U. The chlorides and fluorides of these alkali metals have the threshold of high sensitivity at even shorter wavelengths. Accordingly, a selection of the region of high sensitivity may be made by proper selection of the alkali halide utilized to wavelengths as short as 1000 A.U. For example, potassium chloride is substantially insensitive to all incident radiation having wavelengths longer than 1200 A.U.

In general, however, for most applications the most important criterion in the selection of a photoemitter for vacuum ultraviolet radiation is a high sensitivity to vacuum ultra-violet radiation extending to the vicinity of approximately 2000 A.U. and a negligible sensitivity to longer wavelengths radiation particularly those in the 3000 to 4000 A.U. wavelength range. For this reason, caesium iodide is the preferred photoemitter of the invention. Caesium iodide is an almost ideal far and vacuum ultra-violet photoemitter since, as may be seen, from the curves of Figure 2 of the drawing, wherein curves A, B, C and D represent the electrons per quantum yield for various wavelength stimulating radiations of caesium iodide, potassium iodide, sodium iodide and lithium iodide respectively, that the sensitivity of caesium iodide extends to approximately 2000 A.U. and its absolute electron yield per quantum is somewhat higher than the other illustrated alkali halide photoemitters. Accordingly, caesium iodide is the most nearly ideal far and vacuum ultra-violet photoemitter presently known, and photoelectric tubes constructed in accord with the invention preferably utilized caesium iodide as the photoemitter.

Photosensitive layer 8 on photocathode base 7 need not be very thick in order to be efficiently responsive to vacuum ultra-violet excitation. On the other hand, this layer may be quite thick without detracting from its photoelectric yield. Conveniently, layer 8 may be from 200 A.U. to 1 millimeter in thickness without any substantial influence upon its efficiency as a photoemitter.

While the invention has been described with respect to particular embodiments thereof many modifications and changes will immediately occur to those skilled in the art. Accordingly, I intend by the appended claims to cover all such changes and modifications which fall within the true spirit and scope of the foregoing disclosure.

What I claim as new and desire to secure by Letters Patent of the United States is:

1. An ultra-violet photoelectric cathode consisting essentially of a high purity stoichiometric alkali halide compound said compound being selectively electron emissive when irradiated by far ultraviolet radiation.

2. The cathode of claim 1 wherein the alkali halide is caesium iodide.

3. An ultra-violet photoelectric cathode comprising a conductive base member and a layer of photoemissive material overlying said member, said photoemissive material consisting essentially of a high purity stoichiometric alkali halide compound and being selectively electron emissive when irradiated by far ultraviolet radiation.

4. The cathode of claim 3 wherein the alkali halide is caesium iodide.

5. An ultra-violet sensitive photoelectric cathode comprising a conductive base member and a layer of a high purity stoichiometric alkali halide compound overlying said base member, said compound being substantially insensitive to visible and near ultra-violet radiation but exhibiting a high photo-electric yield when irradiated by vacuum ultra-violet radiations.

6. The cathode of claim 5 wherein the alkali halide is caesium iodide.

7. An ultra-violet photoelectric tube comprising an evacuable vitreous envelope, an ultra-violet transparent window in said envelope, a collector electrode within said envelope, a cathode electrode within said envelope, and a layer of a high purity stoichiometric alkali halide compound upon said cathode electrode said compound being selectively electron emissive when irradiated by far ultraviolet radiation.

8. The device of claim 7 wherein the alkali halide is caesium iodide.

9. A far ultraviolet sensitive photoelectric device comprising an evacuable envelope; an ultraviolet transparent window in said envelope; a collector electrode within said envelope; a cathode electrode within said envelope and closely disposed to said collector electrode; a layer of high purity stoichiometric alkali halide compound having less than one hundred parts per million of impurities therein upon said cathode, said compound being selectively electron emissive when irradiated by far ultraviolet radiation.

10. The device of claim 9 wherein the alkali halide compound is caesium iodide.

11. An ultraviolet sensitive photoelectric device comprising an evacuable envelope; an ultraviolet transparent window in said envelope; a collector electrode within said envelope; a cathode electrode within said envelope and juxtaposed to be irradiated by ultraviolet light passing through said window; a layer of high purity stoichiometric alkali halide compound upon said cathode electrode, said compound being selectively electron emissive when irradiated by far ultraviolet radiation; and means within said envelope closely juxtaposed to said cathode to evaporate said alkali halide layer upon said cathode electrode after a high vacuum has been established within said evacuable envelope.

References Cited in the file of this patent

UNITED STATES PATENTS

| Re. 23,802 | Sheldon | Mar. 16, 1954 |
| 1,917,854 | Rentschler | July 11, 1933 |
| 2,639,963 | Jacobs et al. | May 26, 1953 |

OTHER REFERENCES

Bruining: "Physics and Applications of Secondary Electron Emission," McGraw-Hill Book Co., Inc., New York, 1954.